(12) United States Patent
Park et al.

(10) Patent No.: US 9,715,446 B2
(45) Date of Patent: Jul. 25, 2017

(54) METHOD FOR UPDATING INVERTED INDEX OF FLASH SSD

(71) Applicant: INDUSTRY-ACADEMIC COOPERATION FOUNDATION, YONSEI UNIVERSITY, Seoul (KR)

(72) Inventors: Sang Hyun Park, Seoul (KR); Won Mook Jung, Seoul (KR); Hong Chan Roh, Seoul (KR); Min Cheol Shin, Incheon (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 313 days.

(21) Appl. No.: 14/285,270

(22) Filed: May 22, 2014

(65) Prior Publication Data

US 2014/0351490 A1    Nov. 27, 2014

(30) Foreign Application Priority Data

May 22, 2013  (KR) ........................ 10-2013-0057823

(51) Int. Cl.
*G06F 17/30*  (2006.01)
*G06F 12/02*  (2006.01)

(52) U.S. Cl.
CPC .... *G06F 12/0246* (2013.01); *G06F 17/30622* (2013.01); *G06F 2212/1016* (2013.01); *G06F 2212/7201* (2013.01); *G06F 2212/7202* (2013.01)

(58) Field of Classification Search
CPC .......... G06F 12/0246; G06F 2212/101; G06F 2212/7202; G06F 17/30622; G06F 2212/7201
See application file for complete search history.

(56) References Cited

U.S. PATENT DOCUMENTS

| | | | | |
|---|---|---|---|---|
| 8,977,622 | B1* | 3/2015 | Dutta | G06F 17/30327 707/740 |
| 2006/0294339 | A1* | 12/2006 | Trika | G06F 11/073 711/202 |
| 2008/0059420 | A1* | 3/2008 | Hsu | G06F 17/30631 |
| 2008/0306949 | A1* | 12/2008 | Hoernkvist | G06F 17/30622 |
| 2009/0271359 | A1* | 10/2009 | Bayliss | G06F 17/30303 706/54 |
| 2013/0080465 | A1 | 3/2013 | Tatsumura et al. | |

(Continued)

FOREIGN PATENT DOCUMENTS

KR    10-2011-0042576 A    4/2011

*Primary Examiner* — Alexey Shmatov
*Assistant Examiner* — Kurt Mueller

(57) ABSTRACT

Disclosed is a method for updating an inverted index of a flash solid state disk (SSD). The method including: storing postings of a term that is present in only an in-memory inverted index in a block of an output buffer and reading postings of a last block of each posting list to be updated from an on-disk inverted index to be stored in each block of an input buffer, by scanning the on-disk inverted index and the in-memory inverted index; moving postings of the input buffer to the blocks of the output buffer for each block and attaching new postings of the in-memory inverted index to the block corresponding to the output buffer; and updating the on-disk inverted index by using the postings of each block of the output buffer.

14 Claims, 5 Drawing Sheets

(56) References Cited

U.S. PATENT DOCUMENTS

| | | | | |
|---|---|---|---|---|
| 2013/0238667 A1* | 9/2013 | Carvalho | ......... | G06F 17/30958 |
| | | | | 707/798 |
| 2013/0262443 A1* | 10/2013 | Leida | ............... | G06F 17/30427 |
| | | | | 707/722 |
| 2014/0067762 A1* | 3/2014 | Carvalho | ......... | G06F 17/30958 |
| | | | | 707/636 |
| 2014/0108414 A1* | 4/2014 | Stillerman | ......... | G06F 17/3048 |
| | | | | 707/741 |

* cited by examiner

[FIG. 1]
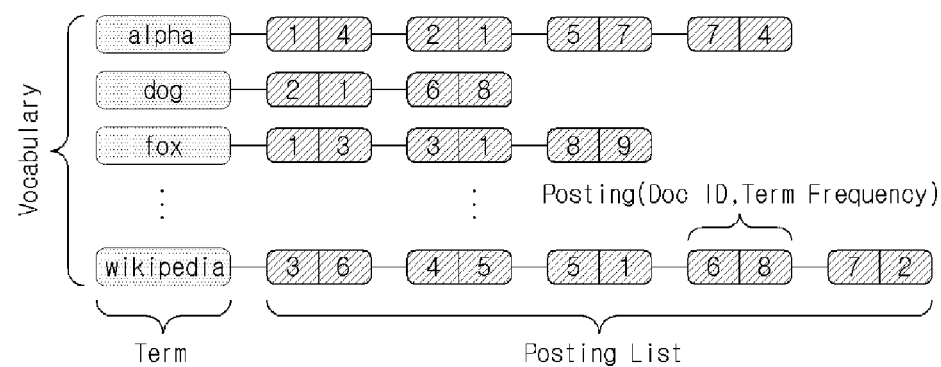
[FIG. 2]
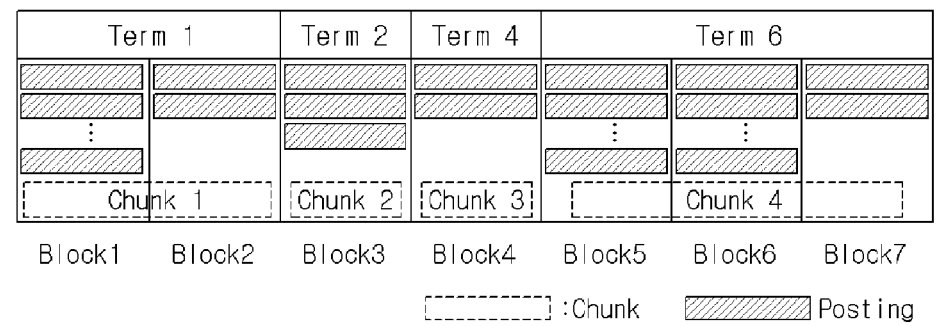

[FIG. 3]
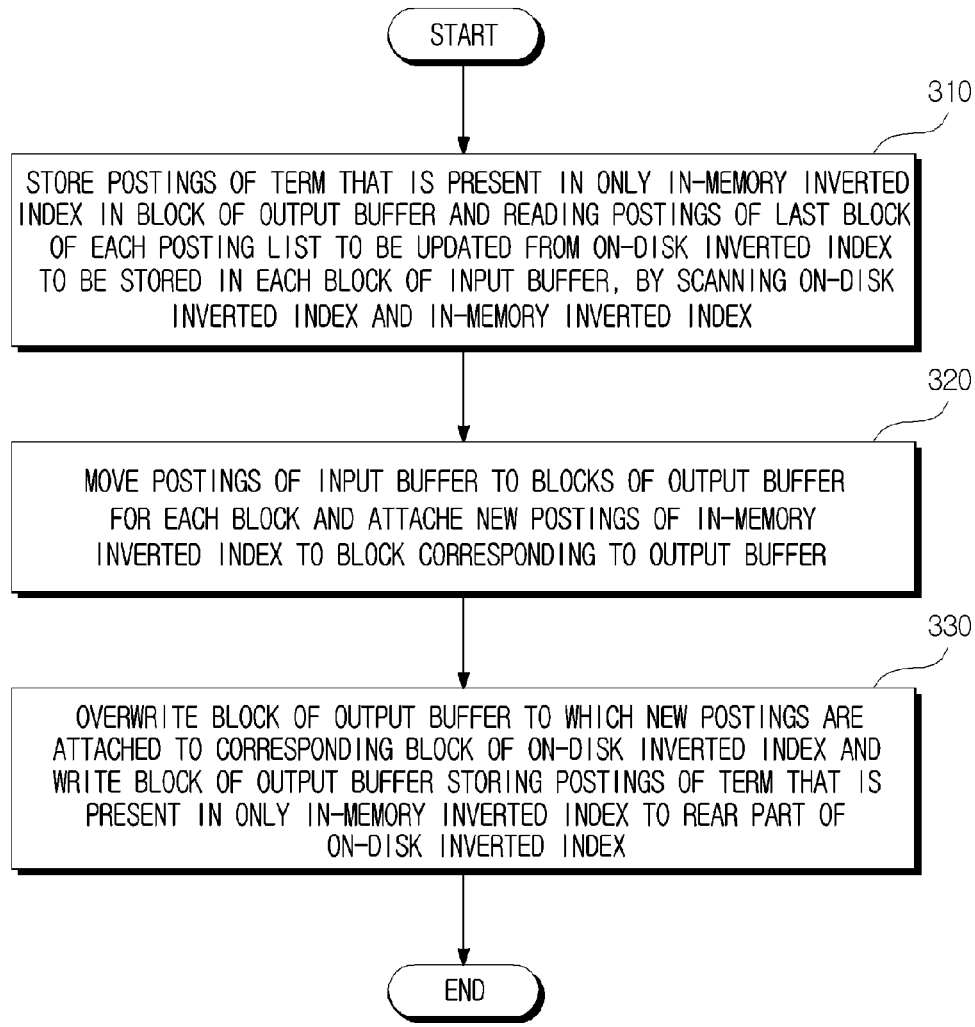

[FIG. 4A]
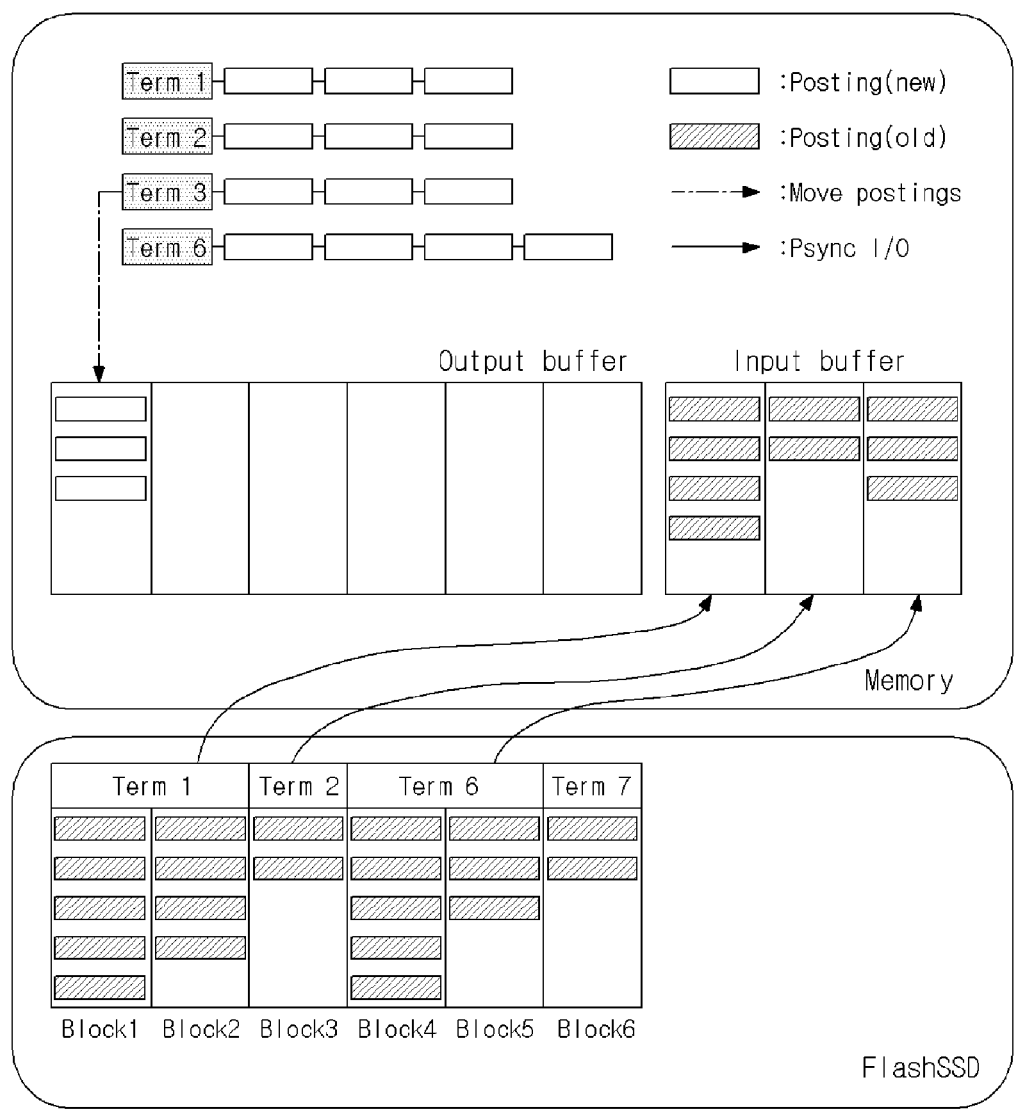

[FIG. 4B]
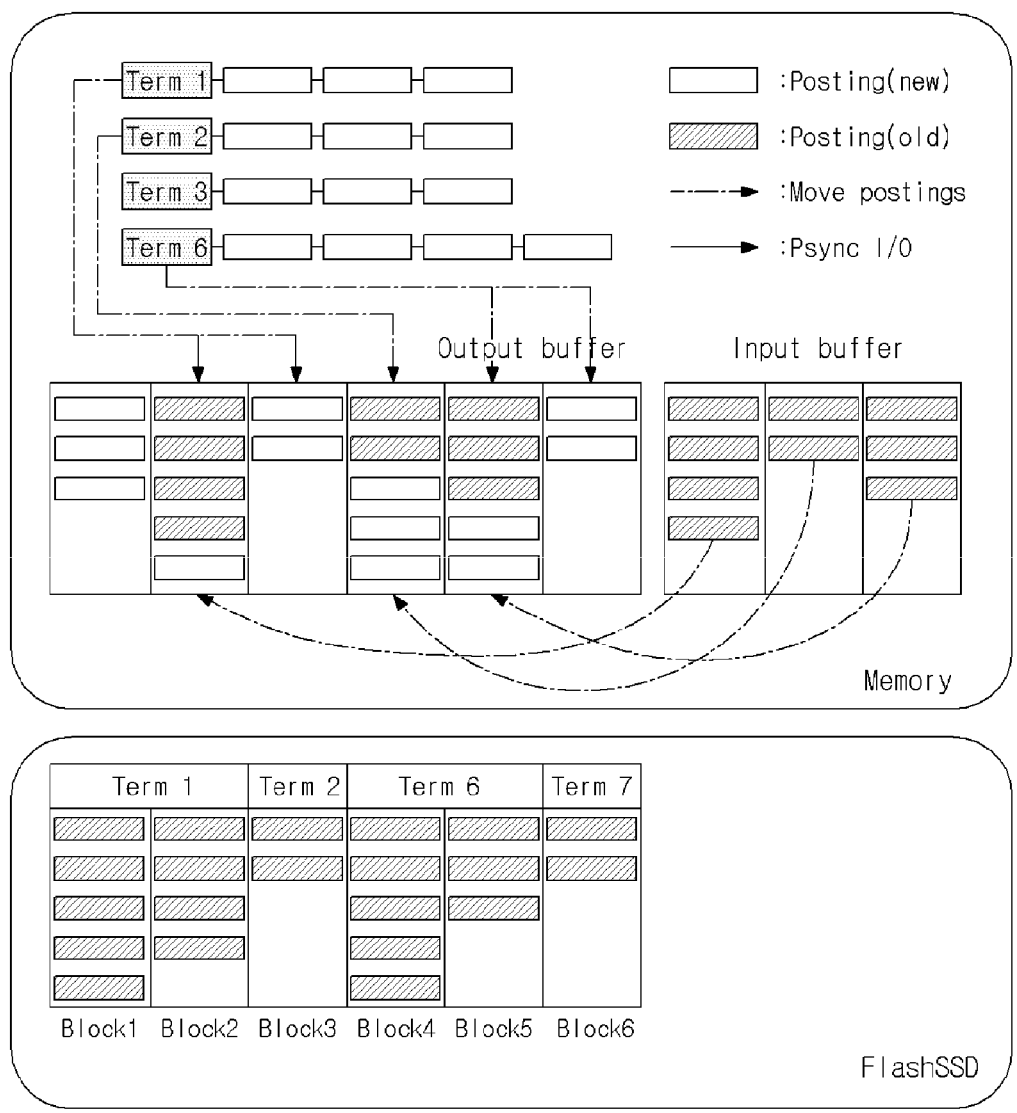

[FIG. 4C]
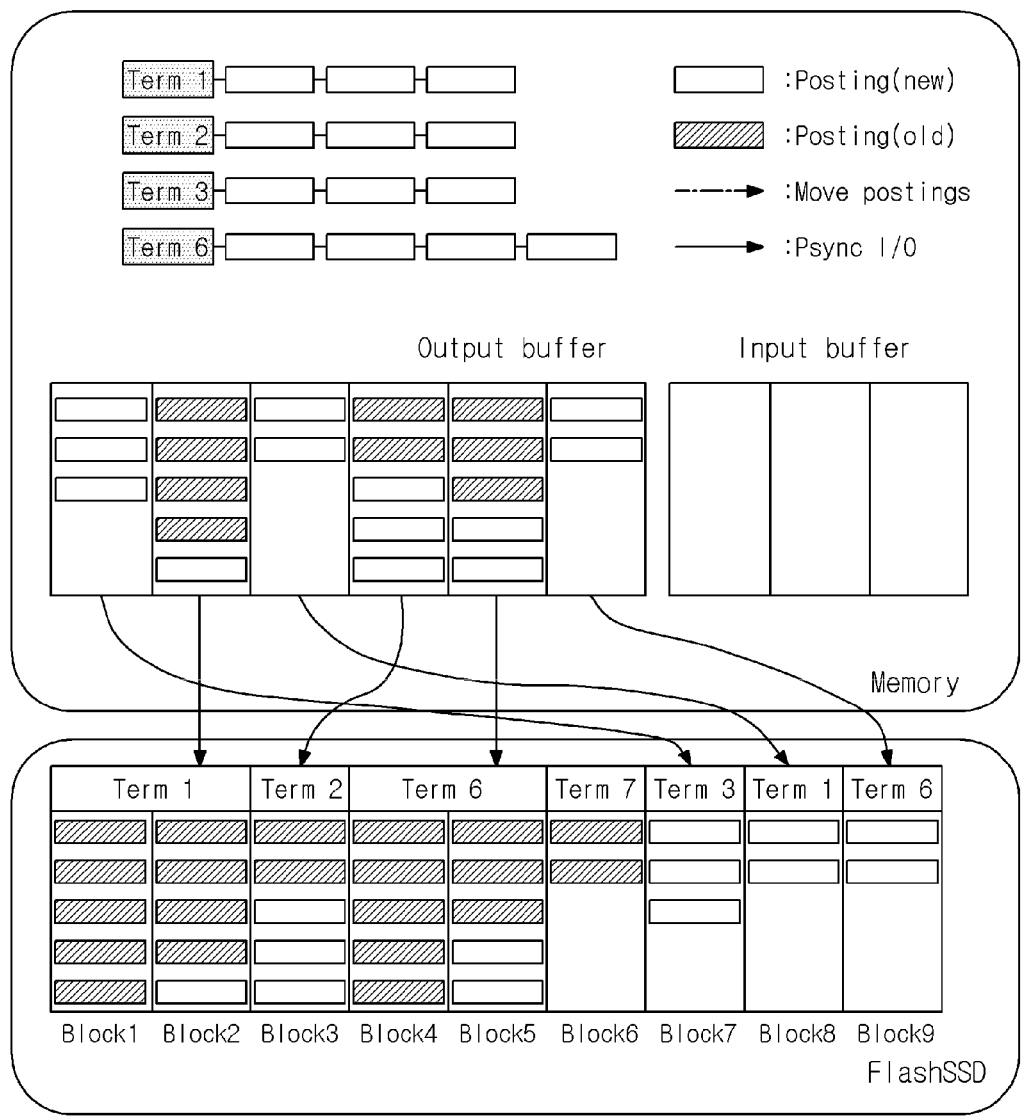

METHOD FOR UPDATING INVERTED INDEX OF FLASH SSD

CROSS-REFERENCE TO RELATED APPLICATIONS

This application claims priority to and the benefit of Korean Patent Application No. 10-2013-0057823 filed in the Korean Intellectual Property Office on May 22, 2013, the entire contents of which are incorporated herein by reference.

RESEARCH INFORMATION

There is national research development work, which supports this invention and is disclosed here within. The work number is 2013035262, under the Ministry name of MINISTRY OF SCIENCE, ICT AND FUTURE PLANNING of Korea where the National Research Foundation of Korea is the specialized organization for this research management. The research project relating to this application is titled "Project for Supporting the Mid-level Researcher (Developed Research)", which was conducted May 1, 2013 to Apr. 30, 2014. The subject of research is the study on the search of disease module and foundation of disease network using data mining analysis techniques. During which, the managing department was INDUSTRY-ACADEMIC COOPERATION FOUNDATION, YONSEI UNIVERSITY.

TECHNICAL FIELD

The present invention relates to an inverted index management method and more particularly, to a method for updating an inverted index of a flash solid state disk (SSD).

BACKGROUND ART

In an information search system such as a search engine, an inverted index is used as a core data structure. FIG. 1 illustrates an example of a structure of the inverted index. The inverted index is constituted by a list (vocabulary) of terms and a list of postings (posting list) of each term as illustrated in FIG. 1. In addition, each posting contains a document ID and a term frequency in a corresponding document. For example, a word "Wikipedia" is contained in documents #3, #4, #5, #6, and #7 and the word is discovered 8 times in the document #6.

As a search environment is diversified and becomes dynamic, such a management technique of the inverted index is researched a lot and a past management technique has been developed by keeping a hard disk drive (HDD) in mind as a storage medium of the inverted index. As well known, since the HDD shows a very slow response speed in a random access, an update strategy of the inverted index concentrates on avoiding a random access.

However, in recent years, the flash solid state disk (SSD) is on the rise as a strong alternative of the HDD. The flash SSD is adopted in a wide area due to excellent performance including short access latency, energy efficiency, a high bandwidth, and the like.

SUMMARY OF THE INVENTION

Since cost is not an important consideration due to the random access in the flash SSD, an algorithm for avoiding the random access is not required in the update strategy of the inverted index.

Therefore, the present invention has been made in an effort to provide a method for effectively updating an inverted index of a flash SSD.

An exemplary embodiment of the present invention provides a method for updating an inverted index of a flash solid state disk (SSD), wherein an on-disk inverted index is constituted by terms and a posting list which is a list of postings corresponding to the respective terms and at least one block which has a predetermined size and is used for containing the postings is provided in each term, and an in-memory inverted index is constituted by input terms and postings corresponding to the respective terms, the method including: storing postings of a term that is present in only the in-memory inverted index in a block of the output buffer and reading postings of a last block of each posting list to be updated from the on-disk inverted index to be stored in each block of the input buffer, by scanning the on-disk inverted index and the in-memory inverted index; moving postings of the input buffer to the blocks of the output buffer for each block and attaching new postings of the in-memory inverted index to the block corresponding to the output buffer; and updating the on-disk inverted index by using the postings of each block of the output buffer.

The on-disk inverted index may include a posting list maintained in a plurality of non-contiguous blocks.

The input buffer may be constituted by blocks of a predetermined number, and scanning the on-disk inverted index and the in-memory inverted index may be performed until all of the blocks of the input buffer are filled.

Reading postings of a last block of each posting list to be updated from the on-disk inverted index may be simultaneously reading the corresponding blocks.

While the new postings of the in-memory inverted index are attached to the block corresponding to the output buffer, if the corresponding block does not have a sufficient space to house the new postings, postings which are not housed in the space of the corresponding block among the new postings may be stored in another block of the output buffer.

In the updating, the blocks of the output buffer to which the new postings are attached may be overwritten in the block corresponding to the on-disk inverted index and the block of the output buffer storing postings of a term which is present in only the in-memory inverted index may be written in a rear part of the on-disk inverted index.

In the updating, the blocks of the output buffer to which the new postings are attached may be overwritten in the block corresponding to the on-disk inverted index and the block of the output buffer storing postings of a term which is present in only the in-memory inverted index and the block of the output buffer storing the new postings that are not housed in the space of the corresponding block may be written in the rear part of the on-disk inverted index.

In the updating, writing and overwriting blocks may be simultaneously writing and overwriting the corresponding blocks.

Another exemplary embodiment of the present invention provides a computer-readable recording medium having a program for executing the method for updating an inverted index of a flash solid state disk (SSD) according to the exemplary embodiment of the present invention, which is recorded therein.

According to the exemplary embodiment of the present invention, the inverted index of the flash SSD can be effectively updated.

Furthermore, according to the exemplary embodiment of the present invention, a maximum bandwidth of the flash SSD can be effectively used by simultaneously reading a block from the inverted index in the disk or simultaneously writing the blocks to the on-disk inverted index.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 illustrates an example of a structure of the inverted index.

FIG. 2 illustrates a structure of an inverted index of a flash SSD according to an exemplary embodiment of the present invention.

FIG. 3 is a flowchart illustrating a method for updating an inverted index of a flash SSD according to an exemplary embodiment of the present invention.

FIG. 4A illustrates an example of a scan phase.

FIG. 4B illustrates an example of a migration phase.

FIG. 4C illustrates an example of a write phase.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the drawings. Hereinafter, like reference numerals refer to like elements in the description and the accompanying drawings. Therefore, a duplicated description will be omitted. In describing the present invention, well-known related functions or configurations will not be described in detail when it is judged that the detailed description for the well-known related functions or configurations may unnecessarily obscure the understanding of the present invention.

FIG. 2 illustrates a structure of an inverted index of a flash SSD, that is, a structure of an on-disk inverted index according to an exemplary embodiment of the present invention. In the exemplary embodiment, a configuration unit of the on-disk inverted index is a block having a predetermined size and one block contains a plurality of postings. The size of one block may be, for example, 8 KB and one block may contain, for example, maximum 1022 postings. One block or a set of blocks consecutively positioned configures a chunk. Referring to FIG. 2, postings of "Term 1" are present on Block1 and Block2 and a chunk of "Term 1" is constituted by Block1 and Block2. Postings of "Term 2" and "Term 4" are present on Block3 and Block4, respectively. A chunk of "Term 2" is constituted by Block3 and a chunk of "Term 4" is constituted by Block4. Postings of "Term 6" are present on Block5, Block6, and Block7 and the chunk of "Term 6" is constituted by Block5, Block6, and Block7.

FIG. 3 is a flowchart illustrating a method for updating an inverted index of a flash SSD according to an exemplary embodiment of the present invention and FIGS. 4A to 4C illustrate one example of a process in which the inverted index of the flash SSD is updated by the method according to the exemplary embodiment.

Referring to FIGS. 4A to 4C, the on-disk inverted index is constituted by terms and a posting list which is a list of postings corresponding to the respective terms, and the configuration unit of the inverted index is a block having a predetermined size and one block contains a plurality of postings as described above. Moreover, the on-disk inverted index may maintain the posting list in a plurality of contiguous blocks with respect to a certain term (for example, Term 1 and Term 6 of FIG. 4A), but maintain the posting list in a plurality of non-contiguous blocks with respect to a certain term in some case. For example, referring to FIG. 4C, the posting list of Term 1 is maintained in first, second, and eighth blocks and the posting list of Term 6 is maintained in fourth, fifth, and ninth blocks.

Referring to FIGS. 4A to 4C, a newly input inverted index is stored in a memory and an inverted index stored in the memory, that is, an in-memory inverted index is constituted by input terms and postings corresponding to the respective terms. In the exemplary embodiment, an input buffer and an output buffer are provided in the memory, and the input buffer and the output buffer are constituted by blocks of a predetermined number, respectively. Blocks of the input buffer and the output buffer is preferably a block having the same size as a block of the on-disk inverted index.

Hereinafter, referring to FIGS. 3 and FIGS. 4A to 4C, a method for updating an inverted index of a flash SSD according to an exemplary embodiment of the present invention will be described.

In step 310, by scanning the on-disk inverted index and in-memory inverted index, postings of a term that is present in only the in-memory inverted index are stored in the output buffer and postings of a last block of each posting list to be updated are read from the on-disk inverted index to be stored in each block of the input buffer. Step 310 will be referred to as a "scan phase" in the specification for convenience. FIG. 4A illustrates an example of the scan phase.

In the scan phase, the on-disk inverted index and the in-memory inverted index are scanned until all blocks of the input buffer are filled. For example, referring to FIG. 4A, the input buffer is constituted by three blocks, and the on-disk inverted index and the in-memory inverted index are scanned until all of three blocks are filled. An inverted index update of scanned parts of the on-disk inverted index and the in-memory inverted index is performed as described through FIG. 3 and when the update is completed, a part next thereto is scanned.

In the scan phase, the term that is present in only the in-memory inverted index represents a term that is present in the in-memory inverted index, but is not present in the on-disk inverted index. For example, referring to FIG. 4A, Term 3 corresponds to the term that is present in only the in-memory inverted index. Accordingly, as illustrated in FIG. 4A, the postings of Term 3 are stored in the output buffer.

In the scan phase, the posting list to be updated means a posting list corresponding to the term that is present in the in-memory inverted index among the posting lists of the on-disk inverted index. For example, referring to FIG. 4A, the posting lists of Terms 1, 2, and 6 of the on-disk inverted index correspond to the posting list to be updated. In addition, the posting list is maintained in one or a plurality of blocks, as described above and when the posting list is maintained in one block (for example, Term 2), the block corresponds to the "last block" and when the posting list is maintained in the plurality of blocks (for example, Terms 1 and 6), a last block of the blocks corresponds to the "last block". Accordingly, as illustrated in FIG. 4A, the postings of the last block of Terms 1, 2, and 6 are read from the on-disk inverted index to be stored in each block of the input buffer.

In the exemplary embodiment of the present invention, when the last block of each posting list to be updated is read from the on-disk inverted index, the corresponding blocks may be read simultaneously. For example, referring to FIG. 4A, the last blocks of Terms 1, 2, and 6 are simultaneously read from the on-disk inverted index to be stored in the input buffer simultaneously. The plurality of blocks is simultaneously read from the flash SSD as described above by using a so-called Psync I/O(Parallel Synchronous I/O) which an inventor of the application has proposed through a document [H. Roh, S. Park, S. Kim, M. Shin, and S.-W. Lee. B+-tree index optimization by exploiting internal parallelism of flash-based solid state drives. Proc. VLDB Endow., 5(4): 286-297, 2011]. As described above, the last blocks of the respective posting lists to be updated are simultaneously read from the on-disk inverted index to effectively utilize a maximum read bandwidth of the flash SSD.

Next, in step 320, the postings of the input buffer are moved to the blocks of the output buffer for each block and new postings of the in-memory inverted index are attached to a block corresponding to the output buffer. Step 320 will be referred to as a "migration phase" in the specification for convenience. FIG. 4B illustrates an example of the migration phase. Herein, the new postings of the in-memory inverted index mean new posting lists of the in-memory inverted index corresponding to the term to be updated. For example, referring to FIG. 4B, the postings of Terms 1, 2, and 6 of the in-memory inverted index correspond thereto.

In the migration phase, while the new postings of the in-memory inverted index are attached to the block corresponding to the output buffer, if the corresponding block does not have a sufficient space to house the new postings, postings which are not housed in the space of the corresponding block among the new postings are stored in another block of the output buffer.

For example, referring to FIG. 4B, the postings (the postings of the last blocks of Terms 1, 2, and 6) stored in the input buffer are moved to the blocks of the output buffer for each block and the new postings of the in-memory inverted index, that is, the new postings of Terms 1, 2, and 6 are attached to the block corresponding to the output buffer. However, a block (fourth block) corresponding to Term 2 of the output buffer has a sufficient space to house a new posting, but a block (second block) corresponding to Term 1 of the output buffer and a block (fifth block) corresponding to Term 6 do not have the sufficient space to house the new posting, and as a result, other additional blocks (third and sixth blocks of the output buffer) are allocated to the posting of Term 1 and the posting of Term 6, respectively and postings which are not housed in an original block are stored in the additionally allocated blocks.

Last, in step 330, the on-disk inverted index is updated by using the postings of each block of the output buffer. Step 330 will be referred to as a "write phase" in the specification for convenience. FIG. 4C illustrates an example of the write phase. In the write phase, specifically, the block of the output buffer to which the new postings of the term that has been already present in the on-disk inverted index are attached is overwritten in the corresponding block of the on-disk inverted index and the block of the output buffer storing the postings of the term that is present in only the in-memory inverted index is written to a rear part of the on-disk inverted index.

However, as described above, in the migration phase, while the new postings of the in-memory inverted index are attached to the block corresponding to the output buffer, the corresponding block does not have the sufficient space to house the new postings, and as a result, postings which are not housed in the space of the corresponding block among the new postings may be stored in another block of the output buffer. In the write phase, the block of the output buffer storing the new postings which are not housed in the space of the corresponding block as described above is written to the rear part of the on-disk inverted index.

For example, referring to FIG. 4C, blocks (second, fourth, and fifth blocks of the output buffer) of the output buffer to which the new postings of Terms 1, 2, and 6, which are terms that have been already present in the on-disk inverted index, are attached are overwritten in blocks (second, third, and fifth blocks of the on-disk inverted index) corresponding to the on-disk inverted index.

A block (a first block of the output block) of the output buffer storing postings of Term 3 which is present in only the in-memory inverted index is written in a seventh block which is a rear part of the on-disk inverted index.

The third and sixth blocks (storing some of the new postings of Term 1 and Term 6, respectively) of the output buffer which are blocks additionally allocated to the output buffer due to the excess of a block housing space are written to eighth and ninth blocks which are rear parts of the on-disk inverted index. The block additionally allocated to the output buffer is written in the rear part of the on-disk inverted index as described above, and as a result, the posting list is maintained in the plurality of non-contiguous blocks. For example, as illustrated in FIG. 4C, the posting list of Term 1 is maintained in the first and second blocks, and the eighth block which is not contiguous thereto and the posting list of Term 6 is maintained in the fourth and fifth blocks, and the ninth block which is not contiguous thereto. The posting list is maintained in the non-contiguous block with respect to each term, and as a result, the amount of input/output data when the in-memory inverted index is joined to the on-disk inverted index may be minimized.

In the exemplary embodiment of the present invention, when the blocks of the output buffer are written and overwritten in the on-disk inverted index in the migration phase, the corresponding blocks may be simultaneously written and overwritten. For example, referring to FIG. 4C, operations of overwriting and writing six blocks of the output buffer in the on-disk inverted index may be simultaneously performed. The plurality of blocks is simultaneously written in the flash SSD as described above by using the so-called Psync I/O (Parallel Synchronous I/O) which the inventor of the application has proposed through a document [H. Roh, S. Park, S. Kim, M. Shin, and S.-W. Lee. B+-tree index optimization by exploiting internal parallelism of flash-based solid state drives. Proc. VLDB Endow., 5(4):286-297, 2011]. A maximum write bandwidth of the flash SSD may be effectively used by simultaneously overwriting and writing the blocks of the output buffer in the on-disk inverted index.

The scan phase, migration phase, and write phase are repeatedly performed until all terms of the on-disk index and the in-memory index are scanned.

The above-described exemplary embodiments of the present invention may be created by a computer executable program and implemented in a general use digital computer which operates the program using a computer readable recording medium. The computer readable recording medium includes a storing medium such as a magnetic storage medium (for example, a ROM, a floppy disk, and a hard disk), and an optical reading medium (for example, CD-ROM, a DVD).

For now, the present invention has been described with reference to the exemplary embodiments. It is understood to those skilled in the art that the present invention may be implemented as a modified form without departing from an essential characteristic of the present invention. Therefore, the disclosed exemplary embodiments should be considered from not a limitative viewpoint but an explanatory viewpoint. The scope of the present invention is described in not the above description but the appended claims, and it should be analyzed that all differences within a scope equivalent thereto are included in the present invention.

Meanwhile, the embodiments according to the present invention may be implemented in the form of program instructions that can be executed by computers, and may be recorded in computer readable media. The computer readable media may include program instructions, a data file, a data structure, or a combination thereof By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for updating an inverted index of a flash solid state disk (SSD), the method comprising:
    wherein an on-disk inverted index of the flash SSD is constituted by terms and a posting list which is a list of postings corresponding to the respective terms, and at least one block which has a predetermined size and is used for containing postings is provided for each term, and
    wherein an in-memory inverted index of a memory is constituted by input terms and postings corresponding to the respective input terms,
    storing postings of an input term that is present in only the in-memory inverted index in a block of an output buffer of the memory and reading out postings of a last block of a posting list of each term to be updated from the on-disk inverted index to thereby storing the read-out postings in a corresponding block of an input buffer of the memory, by scanning the on-disk inverted index and the in-memory inverted index;
    moving the postings stored in the corresponding block of the input buffer to a corresponding block of the output buffer and attaching new postings of each term in the in-memory inverted index to the corresponding block of the output buffer; and
    updating the on-disk inverted index by using the postings of each block of the output buffer,
    wherein in the updating, the blocks of the output buffer to which the new postings are attached are overwritten to the blocks of the on-disk inverted index and the block of the output buffer storing the postings of the input term which is present in only the in-memory inverted index is written in a rear part of the on-disk inverted index.

2. The method of claim 1, wherein the on-disk inverted index includes a posting list maintained in a plurality of non-contiguous blocks.

3. The method of claim 1, wherein the input buffer is constituted by blocks of a predetermined number, and
    scanning the on-disk inverted index and the in-memory inverted index is performed until all of the blocks of the input buffer are filled.

4. The method of claim 1, wherein reading out postings of a last block of a posting list of each term to be updated from the on-disk inverted index is simultaneously reading the corresponding blocks of the on-disk inverted index.

5. The method of claim 1, wherein while the new postings of the in-memory inverted index are attached to the corresponding block of the output buffer, if the corresponding block does not have a sufficient space to house the new postings, postings which are not housed in the space of the corresponding block among the new postings are stored in another block of the output buffer, and, if the corresponding block has the sufficient space to house the new postings, the new postings are stored in the corresponding block.

6. The method of claim 5, wherein in the updating, the block of the output buffer storing the new postings that are not housed in the space of the corresponding block is written to the rear part of the on-disk inverted index.

7. The method of claim 1, wherein in the updating, writing and overwriting blocks is simultaneously writing and overwriting the corresponding blocks.

8. A non-transitory computer-readable recording medium having stored thereon a program for executing a method for updating an inverted index of a flash solid state disk (SSD), which, when executed by a processor, performs a method comprising:

wherein an on-disk inverted index of the flash SSD is constituted by terms and a posting list which is a list of postings corresponding to the respective terms, at least one block which has a predetermined size and is used for containing postings is provided in each term, and wherein an in-memory inverted index of a memory is constituted by input terms and postings corresponding to the respective input terms, storing postings of an input term that is present in only an in-memory inverted index in a block of an output buffer of the memory and reading out postings of a last block of a posting list of each term to be updated from the on-disk inverted index to thereby storing the read-out postings in a corresponding block of an input buffer of the memory, by scanning the on-disk inverted index and the in-memory inverted index;

moving the postings stored in the corresponding block of the input buffer to a corresponding block of the output buffer and attaching new postings of each term in the in-memory inverted index to the corresponding block of the output buffer; and updating the on-disk inverted index by using the postings of each block of the output buffer, wherein in the updating, the blocks of the output buffer to which the new postings are attached are overwritten to the blocks of the on-disk inverted index and the block of the output buffer storing the postings of the input term which is present in only the in-memory inverted index is written in a rear part of the on-disk inverted index.

9. The non-transitory computer-readable recording medium of claim 8, wherein the on-disk inverted index includes a posting list maintained in a plurality of non-contiguous blocks.

10. The non-transitory computer-readable recording medium of claim 9, wherein in the updating, the block of the output buffer storing the new postings that are not housed in the space of the corresponding block is written to the rear part of the on-disk inverted index.

11. The non-transitory computer-readable recording medium of claim 8, wherein the input buffer is constituted by blocks of a predetermined number, and scanning the on-disk inverted index and the in-memory inverted index is performed until all of the blocks of the input buffer are filled.

12. The non-transitory computer-readable recording medium of claim 8, wherein reading out postings of a last block of a posting list of each term to be updated from the on-disk inverted index is simultaneously reading the corresponding blocks of the on-disk inverted index.

13. The non-transitory computer-readable recording medium of claim 8, wherein the updating includes simultaneously writing and overwriting the corresponding blocks.

14. The non-transitory computer-readable recording medium of claim 8, wherein while the new postings of the in-memory inverted index are attached to the corresponding block of the output buffer, if the corresponding block does not have a sufficient space to house the new postings, postings which are not housed in the space of the corresponding block among the new postings are stored in another block of the output buffer, and, if the corresponding block has the sufficient space to house the new postings, the new postings are stored in the corresponding block.

\* \* \* \* \*